No. 651,137. Patented June 5, 1900.
A. H. FRANKE.
OIL FILTER.
(Application filed Mar. 22, 1900.)
(No Model.)
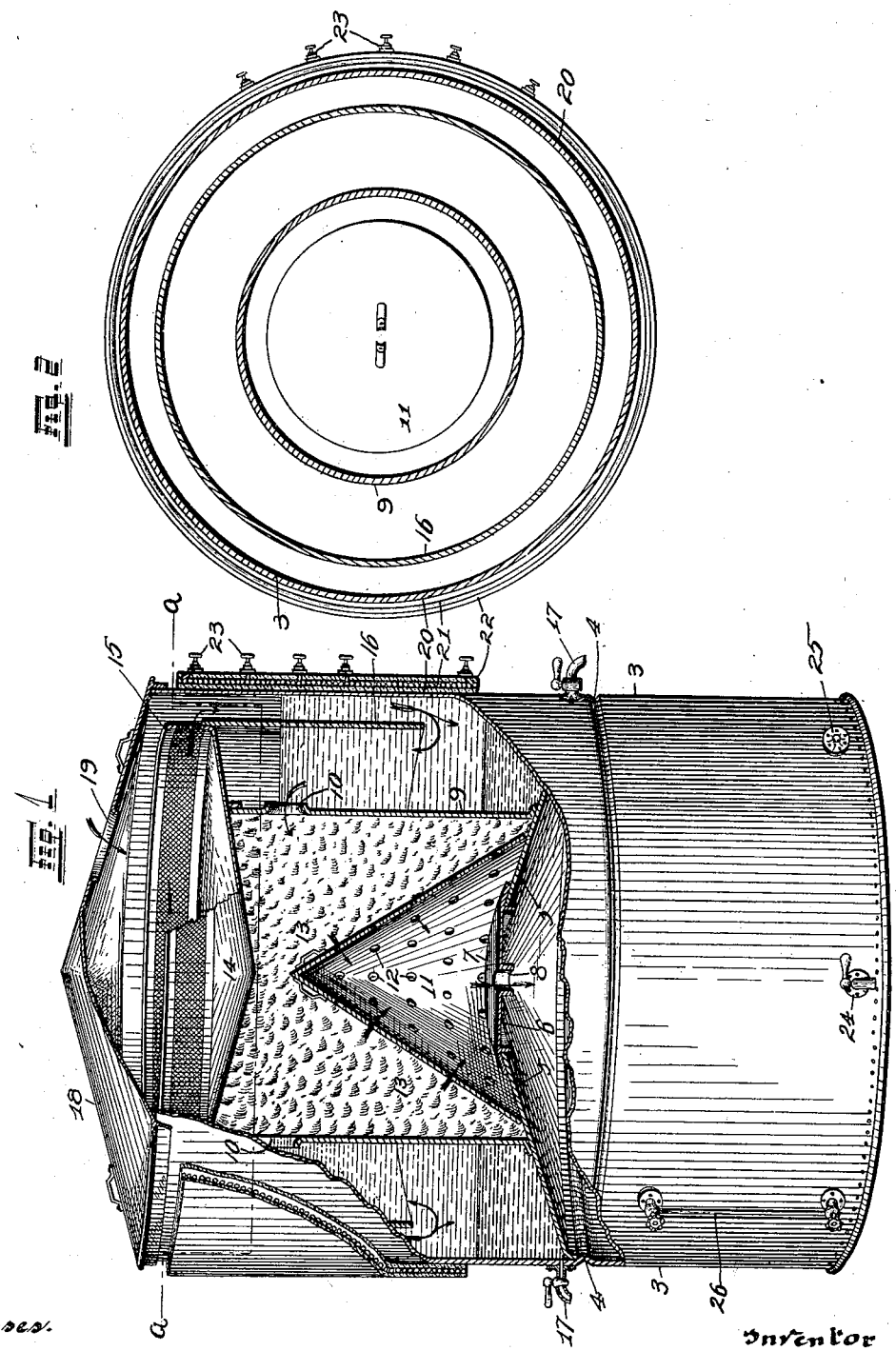
Witnesses:
Alfred W. Eicker
J. W. Rippey
Inventor
August H. Franke.
By Higdon & Longan, Att'ys
THE NORRIS PETERS CO., PHOTO-LITHO., WASHINGTON, D. C.

UNITED STATES PATENT OFFICE.

AUGUST H. FRANKE, OF ST. LOUIS, MISSOURI.

OIL-FILTER.

SPECIFICATION forming part of Letters Patent No. 651,137, dated June 5, 1900.

Application filed March 22, 1900. Serial No. 9,816. (No model.)

*To all whom it may concern:*

Be it known that I, AUGUST H. FRANKE, of the city of St. Louis, in the State of Missouri, have invented certain new and useful Improvements in Oil-Filters, of which the following is a full, clear, and exact description, reference being had to the accompanying drawings, forming a part hereof.

My invention relates to oil-filters; and it consists in the combination of a strainer, settling-chamber, electric heating and solenoid jacket surrounding the settling-chamber, a filtering-chamber, and a reservoir, and arranged as hereinafter shown, described, and claimed.

Figure 1 is a view in perspective with parts broken away to more clearly show the improved features of my invention. Fig. 2 is a sectional view taken approximately at the line $a\,a$ of Fig. 1.

In carrying out this invention I provide a tank having an outer wall 3, a bottom attached to said outer wall, and an inward swage 4, formed in and around said outer wall and at a suitable distance from the bottom. Inside the outer wall 3 and resting upon the swage 4 is securely fitted a conical bottom 5, the said bottom being provided at its apex with a large aperture 6 in order to gain access to the lower bottom. Over this aperture 6 is fitted a flanged disk or plate 7. In the center of the said disk is an aperture 8 to allow the filtered oil to pass into the lower part of the tank, which is the reservoir. Mounted upon the conical bottom 5 is the wall 9, the space between said wall 9 and said outer wall forming the settling-chamber and the space inside of the wall 9 forming the filtering-chamber. The wall 9 is provided near its upper end with a plurality of apertures 10, and within the said wall 9 and inclosing the large aperture 6 is a removable cone 11, the said cone 11 being provided with numerous perforations 12. Over this perforated cone and within the space between the wall 9, forming the filtering-chamber, is placed suitable oil-filtering material 13. Carried upon the upper extremity of the wall 9 is a removable strainer, which comprises the imperforate bottom 14, the same being in the shape of an inverted cone, and secured to the vertical perforated wall 15, attached to the bottom 14, is a deflecting-wall 16, the same inclosing the wall 9 and projecting downward a suitable distance below the aperture 10. Outlets 17 are provided in the outer wall 3 and immediately above the conical bottom 5 for the purpose of withdrawing the precipitated impurities from the settling-chamber. The opening 19 in the cover 18 is for the purpose of passing the oil into the filter without taking off the cover. Surrounding the said settling-chamber and around and attached to said outer wall 3 is secured an insulation 20 of asbestos or other suitable material, and around and over this wrapping 20 is wound one or more layers of German-silver wire or other suitable electric heating material 21, and over this layer is secured a covering of asbestos or other suitable material 22. Numerous conductors 23 are connected to the said German-silver wire 21 at suitable distances apart and terminate outside of the covering 22, for the purpose to heat the oil in the said settling-chamber, and also to pass lines of magnetic force through the oil within the magnetic zone—viz., the space between the outer wall 3 and the deflecting wall 16—by passing an electric current through the electric heating material 21, which forms a solenoid-jacket around the settling-chamber. In order to suitably regulate this heat and also the magnetic flow, the volume of current passing through this electric heating material is decreased or increased by connecting one electric-current terminal to the bottom conductor 23 and the other terminal to the first, second, third, or fourth upper conductor 23, thereby offering more or less resistance to the current by increasing or decreasing its length of travel through the said German-silver wire or other suitable electric heating material.

In operation the oil to be purified is passed through the openings 19 into the removable strainer 14 and 15, which retains all the coarser impurities. The oil then passes through the straining-surface 15, and then down toward the bottom of the settling-chamber. The unsettled oil is kept away from the filtering material 13 by the deflecting-shield 16, which hangs in the settling-chamber. The proper temperature is safely and gradually communicated to the oil in the settling-chamber by the electric heating-jacket 21, and innumerable lines of magnetism are constantly passing through the oil within the magnetic zone, the settling-chamber being always full of oil, by the solenoid action of the said electric heating-jacket. In this manner the oil is first strained, then settled, heated, and renewed, and most of the impurities are extracted from the oil before the oil overflows into the filtering-chamber through the apertures 10. The oil then gradually percolates through the filtering material and through the perforated cone, thereby extracting the remaining impurities from the oil. The purified oil then passes through the aperture 8 into the reservoir, where it is cooled, and may be withdrawn through the outlet 24 or through the port 25. The glass gage 26 shows the amount of purified oil in this reservoir.

I claim—

1. In an oil-filter, an outer inclosing wall, a bottom attached to said outer inclosing wall, one or more layers of electric heating material surrounding part or all of said outer wall for the purpose of heating the oil within said outer wall by passing an electric current through the said one or more layers of suitable electric heating material, all for the purpose of assisting in purifying the oil, substantially as specified.

2. In an oil-filter, an outer inclosing wall, a bottom attached to said outer inclosing wall, one or more layers of suitable electric conducting material forming a solenoid-magnet surrounding said outer wall, for the purpose of passing a flow of magnetism through the oil within the said outer wall by passing an electric current through the said one or more layers of suitable electric conducting material surrounding the said outer wall and forming a solenoid-magnet all for the purpose of assisting in renewing and purifying the oil, substantially as specified.

3. In an oil-filter, an outer inclosing wall, a bottom attached to said outer inclosing wall, one or more layers of suitable electric heating and electric conducting material surrounding the said outer wall, a plurality of suitable inlets and outlets connected to the said one or more layers of electric heating and conducting material at suitable distances or spaces within its length for the purpose of decreasing and increasing the temperature of the oil within the said outer wall and also for the purpose of decreasing and increasing the flow of magnetism through the said oil by passing an electric current through the entire length or only part of the entire length of said electric heating and conducting material surrounding the said outer wall containing the said oil, all for the purpose of assisting in purifying and renewing the oil, substantially as specified.

4. An oil-filter, comprising an outer inclosing wall, a conical bottom within said inclosing wall, an inner inclosing wall carried upon said conical bottom there being apertures in the said second-mentioned wall near its upper extremity, a strainer carried by said second-mentioned wall, which strainer comprises an imperforate bottom in the form of an inverted cone, a perforate wall carried by said bottom, and a downwardly-pending deflecting-wall carried by the said strainer, substantially as specified.

5. An oil-filter, comprising an outer inclosing wall, a conical bottom within said inclosing wall, there being an aperture through said conical bottom, a flanged disk over the said aperture, a perforate cone inclosing said aperture and disk, an inner retaining-wall having apertures near its top secured upon said conical bottom and inclosing the said cone, suitable filtering material inclosed within said inner wall, a strainer carried by said inner inclosing wall, a deflecting-shield carried by said strainer, which shield projects downwardly a suitable distance below the apertures in the said inner retaining-wall, and a lid or top removably carried by said outer inclosing wall, substantially as specified.

6. An improved oil-filter, comprising an outer inclosing wall, a bottom attached to said outer inclosing wall, a conical bottom carried within said outer wall, an inner inclosing wall carried upon said conical bottom, a perforate cone inclosed in said inner wall, filtering material within the said inner wall and over the said cone, a suitable strainer carried by said inner wall, a deflecting-shield suspended from the said strainer, one or more layers of electric heating and electric conducting material surrounding part of said outer wall, for the purpose of heating and purifying the oil within the outer wall, outlets for drawing off the precipitated impurities from the settling-chamber, and outlets for drawing off the purified oil from the reservoir, substantially as specified.

In testimony whereof I affix my signature in presence of two witnesses.

AUGUST H. FRANKE.

Witnesses:
ALFRED A. EICKS,
JOHN D. RIPPEY.